(12) United States Patent
Hartke et al.

(10) Patent No.: US 6,234,148 B1
(45) Date of Patent: May 22, 2001

(54) METHOD AND DEVICE FOR MONITORING A PRESSURE SENSOR

(75) Inventors: Andreas Hartke, München; Christian Birkner, Irlbach, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/379,220

(22) Filed: Aug. 23, 1999

Related U.S. Application Data

(63) Continuation of application No. PCT/DE98/03041, filed on Oct. 16, 1998.

(30) Foreign Application Priority Data

Dec. 23, 1997 (DE) .............................. 197 57 655

(51) Int. Cl.⁷ .............................. F02M 7/00; F02M 41/00
(52) U.S. Cl. .................. 123/447; 123/456; 123/198 D
(58) Field of Search .................... 123/447, 479, 123/456, 198 D; 73/4 R, 115

(56) References Cited

U.S. PATENT DOCUMENTS

| | | | |
|---|---|---|---|
| 4,566,309 * | 1/1986 | Van Belzen et al. | 73/4 R |
| 4,884,545 * | 12/1989 | Mathis | 123/447 |
| 5,413,404 * | 5/1995 | Inagawa | 303/92 |
| 5,727,515 * | 3/1998 | Biester | 123/198 D |
| 5,974,865 * | 11/1999 | Dambach | 73/49.7 |

FOREIGN PATENT DOCUMENTS 41 31 401 C1    11/1992 (DE) .

* cited by examiner

Primary Examiner—Henry C. Yuen
Assistant Examiner—Mahmoud M Gimie
(74) Attorney, Agent, or Firm—Herbert L. Lerner; Laurence A. Greenberg; Werner H. Stemer

(57) ABSTRACT

A method for monitoring a pressure sensor, which determines a pressure in a pressure accumulator regulated by a pressure actuator, includes the steps of calculating an expected pressure value in the pressure accumulator for a given point in time based on a holding pressure preset by the pressure actuator and based on a detected rate of change in a mass balance of a medium contained in the pressure accumulator. A pressure value in the pressure accumulator is determined with the pressure sensor at the given point in time. The expected pressure value is compared with the determined pressure value and a malfunction in the pressure sensor is detected if the pressure values deviate from each other beyond a predetermined value. A device for monitoring a pressure sensor is also provided.

8 Claims, 5 Drawing Sheets

METHOD AND DEVICE FOR MONITORING A PRESSURE SENSOR

CROSS-REFERENCE TO RELATED APPLICATION

This application is a continuation of copending International Application PCT/DE98/03041, filed Oct. 16, 1998, which designated the United States.

BACKGROUND OF THE INVENTION

1. Field of the Invention

The invention relates to a method and a device for monitoring a pressure sensor which sets the pressure in a pressure accumulator, in particular in a high-pressure accumulator for a fuel supply system.

High-pressure accumulators are used in fuel supply systems, primarily in fuel injection systems for internal combustion engines which operate with very high injection pressures. Such injection systems, which, in diesel engines, are known as common-rail systems, have marked advantages, as compared with conventional injection systems, in terms of flexibility and costs. In these injection systems, a high-pressure pump conveys fuel out of a fuel tank into the pressure accumulator, via which the fuel is then made available at injection valves which are provided in the cylinder heads of the engine. The process of injection into the cylinders is triggered by supplying current to the injection valves. The injection volume depends on the pressure present at the injection valves and on the duration of the current supply.

The pressure in the pressure accumulator is regulated by a pressure actuator which is set by an electronic engine control unit. This engine control unit, via a sensor connected to the pressure accumulator, also detects the pressure level, so that the pressure actuator can be adjusted correctly. The pressure sensor therefore also performs an essential function in setting the pressure in the pressure accumulator. A malfunctioning of the pressure sensor and the resulting error in the pressure control of the pressure accumulator may result in an impaired injection behavior and therefore in an impaired combustion characteristic, and this, in turn, may entail an increased emission of pollutants.

Pressure sensors which are equipped with a function monitoring device and with additional measurement transducers are known. However, these additional measurement transducers result in a considerable increase in the cost of manufacturing the sensors. Furthermore, such function monitoring devices must also be adapted in their construction to the respective circumstances in the internal combustion engine, thus incurring additional costs. Published German patent application DE 195 13 158 A1 discloses a method for detecting a leak in a fuel supply system, in which the gradient of the fuel pressure is evaluated in the system after the fuel pump has been switched off. A fault detection is carried out if the pressure reduction in a part of the fuel supply system takes place more quickly than expected. Furthermore, German Patent DE 41 31 401 C1 discloses a method and a device for monitoring pressure sensors in a medical operating system. The range of fluctuation of the pressure signals for a specific operating pressure, which are delivered by the pressure sensors to be monitored, is compared with a desired range of fluctuations for detecting faults.

SUMMARY OF THE INVENTION

It is accordingly an object of the invention to provide a method and a device for monitoring the functioning of a pressure sensor which overcome the above-mentioned disadvantages of the heretofore-known methods and devices of this general type and which determine the pressure in a pressure accumulator regulated by a pressure actuator and which check the functioning and operability of the pressure sensor in a simple and reliable manner without requiring additional measurement transducers.

With the foregoing and other objects in view there is provided, in accordance with the invention, a method for monitoring a pressure sensor determining a pressure in a pressure accumulator regulated by a pressure actuator. The method includes the steps of:

calculating an expected pressure value in a pressure accumulator for a given point in time based on a holding pressure preset at a pressure actuator and based on a detected rate of change in a mass balance of a medium contained in the pressure accumulator;

determining a pressure value in the pressure accumulator with a pressure sensor at the given point in time;

comparing the expected pressure value with the pressure value determined by the pressure sensor for detecting a difference value; and detecting a malfunction in the pressure sensor if an absolute value of the difference value exceeds a predetermined difference value.

In accordance with another mode of the invention, a gradient of the expected pressure value and a gradient of the pressure value determined by the pressure sensor are calculated, the gradients are compared with each other, and a malfunction in the pressure sensor is detected if an absolute value of the difference between the gradients exceeds a predetermined value.

In accordance with yet another mode of the invention, the holding pressure in the pressure accumulator is calculated from a control value of the pressure actuator, which is delayed by a predetermined time constant, the holding pressure being preset at the pressure actuator for the given point in time.

In accordance with a further mode of the invention, the holding pressure is calculated from the control value in dependence of a rotational speed of an internal combustion engine and/or a cooling temperature of the internal combustion engine.

In accordance with yet a further mode of the invention, the rate of change in the mass balance of the medium contained in the pressure accumulator at the given point in time is calculated from an injection mass flow into an internal combustion engine, from a leakage mass flow of injection valves of the internal combustion engine, and from a feed mass flow supplied to the pressure accumulator, the pressure sensor is monitored during a pressure build-up operating state of the internal combustion engine with the pressure actuator closed.

With the objects of the invention in view there is also provided in an injection system having a pressure sensor determining a pressure in a pressure accumulator regulated by a pressure actuator, a device for monitoring the pressure sensor. The device for monitoring comprises:

an accumulator pressure evaluation unit for calculating an expected pressure value in a pressure accumulator for a given point in time based on a holding pressure preset at a pressure actuator and based on a detected rate of change in a mass balance of a medium contained in the pressure accumulator; and a comparator unit connected to the accumulator pressure evaluation unit for comparing the expected pressure value calculated for the given point in time with a pressure value determined by a pressure sensor at the given point in time and detecting a malfunction in the pressure sensor if an absolute value of a difference between the expected pressure value and the pressure value determined by the pressure sensor exceeds a predetermined difference value.

In accordance with another feature of the invention, the comparator unit includes a model pressure calculation unit for calculating a gradient of the expected pressure value, a sensor pressure calculation unit for calculating a gradient of the pressure value determined by the pressure sensor, and a gradient difference unit connected to the model pressure calculation unit and to the sensor pressure calculation unit for calculating a gradient difference between the calculated gradients and for detecting a malfunction in the pressure sensor if an absolute value of the gradient difference between the calculated gradients exceeds a predetermined gradient difference value.

In accordance with yet another feature of the invention, a pressure actuator evaluation unit is connected to the accumulator pressure evaluation unit and has a delay element of the first order for calculating the holding pressure preset at the pressure actuator from a control value of the pressure actuator, delayed by a predetermined time constant.

In accordance with a further feature of the invention, the pressure actuator evaluation unit includes a holding pressure mapping unit for calculating the holding pressure from the control value of the pressure actuator in dependence on a rotational speed of an internal combustion engine, and includes a temperature mapping unit for determining a correction value of the holding pressure according to a temperature of the internal combustion engine.

In accordance with yet a further feature of the invention, the accumulator pressure evaluation unit includes a delay element of the first order for calculating the expected pressure value in the pressure accumulator at the given point in time based on the holding pressure preset at the pressure actuator, delayed by a time constant, the time constant being calculated in dependence on the detected rate of change in the mass balance of the medium contained in the pressure accumulator at the given point in time.

According to the invention, the pressure value to be expected at a specific point in time in a pressure accumulator is calculated on the basis of a holding pressure predetermined in a pressure actuator and pollutant of a detected rate of change in the mass balance of a medium contained in the pressure accumulator and this calculated pressure value is compared with the pressure value recorded at the specific point in time by a pressure sensor, in order to detect a malfunction in the pressure sensor in the event of a deviation beyond the predetermined difference. The method according to the invention makes it possible, with the aid of a simple model and therefore a low outlay in terms of data processing, to carry out a reliable functional analysis of the pressure sensor and thereby detect both slow fault processes, such as a sensor drift, and a sudden sensor failure. Furthermore, in order to diagnose the functioning of the pressure sensor, no additional data are required beyond the measurement data already conventionally detected in injection systems. The device according to the invention is therefore distinguished by a low outlay in terms of circuitry, at the same time dispensing with additional costly measurement transducers, and can also be integrated into the control of an internal combustion engine in a simple way.

Other features which are considered as characteristic for the invention are set forth in the appended claims.

Although the invention is illustrated and described herein as embodied in a method and device for monitoring the functioning of a pressure sensor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
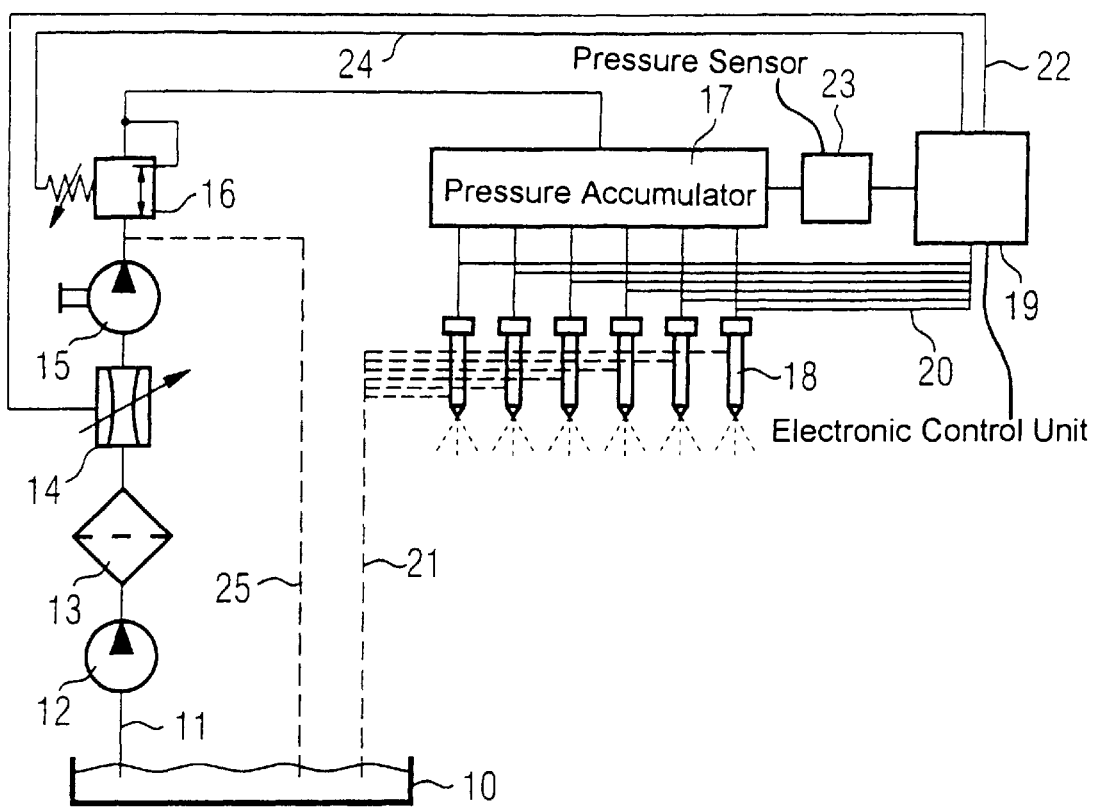
FIG. 1 is a schematic diagram of a fuel injection system.

Referring now to the figures of the drawings in detail and first, particularly, to FIG. 1 thereof, there is shown a diagram of the structure of a fuel injection system. Such a fuel injection system is called common-rail system and is used mainly in diesel engines. In this injection system, the fuel is sucked out of a fuel tank 10 via a fuel line 11 by a prefeed pump 12. The prefeed pump 12 feeds the fuel via a fuel filter 13 to a high-pressure pump 15 which compresses the fuel and feeds it under high pressure into a pressure accumulator 17. The pressure accumulator 17 is connected to injection valves 18, via which the fuel is injected into the cylinders of the internal combustion engine (not shown). The injection operation is triggered by an electronic control unit 19 which is connected to the injection valves 18 via signal lines 20. The leakage fuel stream occurring in the injection valves 18 is returned to the fuel tank 10 via fuel lines 21.

In order to be able to adjust the volume flow of the high-pressure pump 15 as required in accordance with the respective operating conditions of the internal combustion engine, an additional suction throttle valve 14 is provided in the fuel line 11 between the prefeed pump 12 and the high-pressure pump 15. The feed flow of the high-pressure pump can be regulated with the aid of the suction throttle valve. This suction throttle valve 14 is acted upon by the control unit 19 via a control line 22. Alternatively, however, the feed flow of the high-pressure pump 15 may also be influenced via a variable step-up gearing for the drive of the high-pressure pump or by a pressure-regulated and/or speed-regulated configuration of the prefeed pump 12.

In order to be able adjust the pressure in the pressure accumulator 17 according to the desired operating conditions of the internal combustion engine, furthermore, a pressure regulating valve 16 is inserted into the fuel line 11 between the high-pressure pump 15 and the pressure accumulator 17. Via a fuel line 25, this pressure regulating valve 16 guides excess fuel, which is not required for maintaining a desired pressure in the pressure accumulator 17, into the fuel tank 10. The pressure regulating valve 16 has an actuator which closes an inlet orifice in the pressure regulating valve with a predetermined holding pressure, the holding pressure being set by the control unit 19, via a control line 24, according to the desired pressure in the pressure accumulator 17. For this purpose, the control unit 19 transmits a pulse-width modulated activating signal or control signal to the pressure regulating valve 16 via the control line 24. A pulse duty ratio or duty factor of this pulse-width modulated activating signal predetermines the holding pressure of the actuator.

In order to regulate the pressure in the pressure accumulator 17, the fuel injection system shown in FIG. 1 also has a pressure sensor 23 which is provided preferably in an end face of the generally cylindrical pressure accumulator 17. This pressure sensor 23 serves for detecting a currently prevailing pressure in the pressure accumulator 17. Based on this currently prevailing pressure, the control unit 19 then carries out a pressure regulation with the pressure regulating valve 16 in accordance with the desired operating conditions of the internal combustion engine. The pressure sensor 23 is therefore an essential part of the pressure regulating circuit in the fuel injection system and must be accurately monitored in terms of its functioning, in order to prevent faults in the pressure setting in the pressure accumulator 17 which are triggered by a defect of the pressure sensor and which influence the combustion behavior in the internal combustion engine. Direct monitoring of the functioning of the pressure sensor 23 through the use of a function monitoring unit integrated in the pressure sensor and equipped with transducers for acquiring data in the pressure sensor is possible, but results in high production costs for the pressure sensor. Moreover, such a function monitoring unit integrated in the pressure sensor must also be adapted to the special circumstances of the internal combustion engine. According to the invention, however, such a direct function monitoring unit with additional measurement transducers may be dispensed with.

Figure 2:
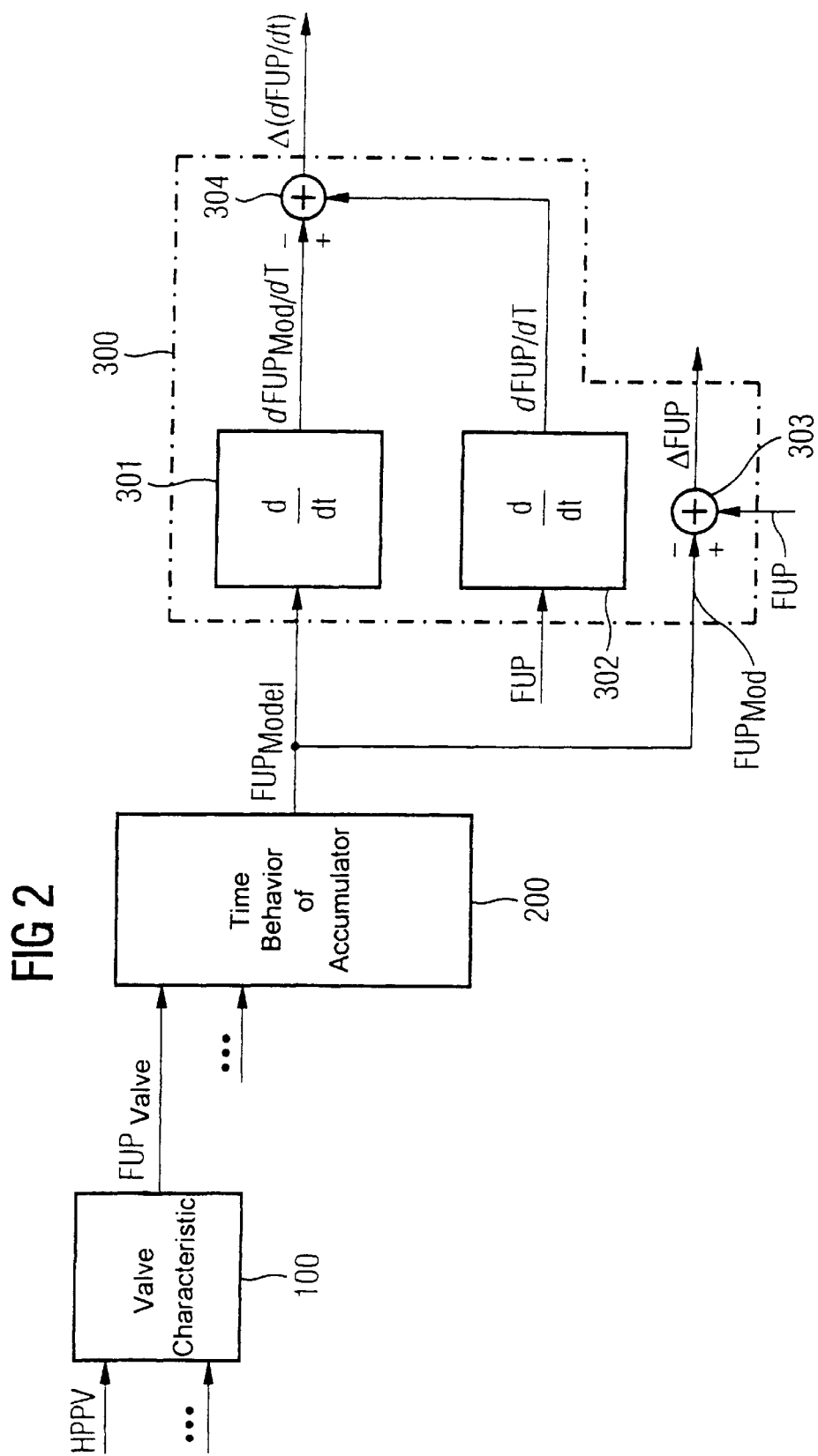
FIG. 2 is a block diagram of a basic configuration of a function monitoring system according to the invention for a pressure sensor in a fuel injection system according to FIG. 1.

A function monitoring unit according to the invention for a pressure sensor, wherein the unit is used in a fuel injection system according to FIG. 1, is shown in its basic configuration in FIG. 2. This function monitoring unit has a pressure actuator evaluation unit 100 which, through the use of the duty ratio HPPV of the pulse-width modulated activating signal for the pressure regulating valve 16, calculates the current holding pressure $FUP_{valve}$ of the pressure regulating valve in terms of its absolute value and its time behavior. According to an advantageous embodiment, this pressure actuator evaluation unit 100 may also take into account, when calculating the holding pressure $FUP_{valve}$, a temperature behavior of the pressure regulating valve and the dependence of the valve characteristic on a rotational speed of the internal combustion engine.

The pressure actuator evaluation unit 100 supplies the calculated holding pressure $FUP_{valve}$ to an accumulator pressure evaluation unit 200 which calculates from it the pressure currently prevailing in the pressure accumulator 17. In this pressure calculation the accumulator pressure evaluation unit 200 takes into account the current mass balance of the fuel in the pressure accumulator 17, wherein the mass balance can be determined from the measurement data detected by the control unit 19. The calculation of the mass balance of the fuel in the pressure accumulator 17 is based on the following simple model:

A positive mass balance in the pressure accumulator indicates that the fuel is compressed and the pressure in the pressure accumulator is rising. By contrast, if the mass balance is negative, the fuel present in the pressure accumulator decreases and the pressure in the pressure accumulator falls. The temporal change of the fuel quantity $\dot{m}_s$ stored in the pressure accumulator and therefore the temporal change of the pressure in the pressure accumulator are determined through the use of the fuel streams fed into the pressure accumulator and discharged from it. The fuel mass flow $\dot{m}_{out}$ discharged from the pressure accumulator 17 is composed, in this case, of the injection mass flow $\dot{m}_i$ injected into the internal combustion engine via injection valves 18, of the leakage mass flow $\dot{m}_l$ discharged via the injection valves 18 and of the valve mass flow $\dot{m}_v$ carried away by the pressure regulating valve 16. The fuel mass flow $\dot{m}_{in}$ fed into the pressure accumulator 17 is determined by the feed mass flow $\dot{m}_p$ of the high-pressure pump 15. The following equations thus apply:

$$\dot{m}_s = \dot{m}_{in} - \dot{m}_{out} \quad (1)$$

with $$\dot{m}_{in} = \dot{m}_p \quad (2)$$

$$\dot{m}_{out} = \dot{m}_i + \dot{m}_l + \dot{m}_v \quad (3)$$

In this case, the feed mass flow $\dot{m}_p$ is determined by the activating signal of the control unit 19 for the high-pressure pump 15 of the suction throttle valve 14. The following also applies to the injection mass flow $\dot{m}_i$:

$$\dot{m}_i = N \times m_i \quad (4)$$

N corresponds to the rotational speed of the internal combustion engine and $m_i$ corresponds to the injection mass per cylinder of the internal combustion engine. The leakage mass flow $\dot{m}_l$ is specific to the injection valves 18 used.

The valve mass flow $\dot{m}_v$ carried away by the pressure regulating valve 16 is determined from the respective operating state of the internal combustion engine. During a pressure reduction phase in the pressure accumulator, for example when the internal combustion engine is stopped, the pressure regulating valve 16 is opened completely, so that the valve mass flow $\dot{m}_v$ determines the fuel mass flow $\dot{m}_{out}$ discharged from the pressure accumulator 17. In this case, the injection mass flow $\dot{m}_i$ and the leakage mass flow $\dot{m}_l$ are negligible and the fuel mass flow $\dot{m}_{out}$ discharged from the pressure accumulator 17 is defined solely by the valve mass flow $\dot{m}_v$ which is determined by the flow cross section of the pressure regulating valve.

In the case of a pressure build-up phase in the pressure accumulator 17, which occurs for example when the internal combustion engine is started or when a rapid increase in rotational speed is carried out, the pressure regulating valve 16 is closed completely and the valve mass flow $\dot{m}_v$ can be set to zero.

By contrast, when the injection system is in a stable operating state, that is to say when it is not in the pressure build-up or pressure reduction phase, the fuel mass flow $\dot{m}_{in}$ fed into the pressure accumulator 17 corresponds to the fuel mass flow $\dot{m}_{out}$ discharged from the pressure accumulator, so that the overall balance is zero.

On the assumption of a constant volume $V_s$ for the pressure accumulator, the following relation is obtained for the pressure in the pressure accumulator $p_s$:

$$p_s = K\left(1 - \frac{\rho_0}{\rho_s}\right) + p_0 \qquad (5)$$

K corresponding to the bulk modulus, $p_0$ to the normal pressure, $\rho_0$ to the fuel density in the normal state and $\rho_s$ to the fuel density for the currently prevailing accumulator pressure $p_s$. The following relation also applies to the fuel density $\rho_s$:

$$\rho_s = \int \dot{m}_s / V_s \, dt \qquad (6)$$

If equation (6) is substituted in equation (5), the following is obtained for the accumulator pressure $$p_s = K\left(1 - \frac{\rho}{\int \dot{m}_s / V_s dt}\right) + p_0 \qquad (7)$$

The accumulator pressure evaluation unit 200 can therefore determine the currently prevailing pressure in the pressure accumulator 17 in a simple way through the use of equation (7), taking into account equation (1). Particularly suitable operating states of the internal combustion engine in this case are, on the one hand, the stable operating point, at which the mass balance is zero, and the pressure build-up phase, in which no fuel is spilled via the pressure regulating valve 16 and therefore the valve mass flow $\dot{m}_v$ can be set to be zero.

The instantaneous or current pressure in the pressure accumulator 17, which is calculated by the accumulator pressure evaluation unit 200 and which is designated in FIG. 2 by $FUP_{model}$, is supplied to a comparator unit 300, to which the pressure FUP detected by the pressure sensor 23 is simultaneously applied. The comparator unit 300 has a model pressure calculation unit 301 and a sensor pressure calculation unit 302 which determine the gradient from the applied model pressure $FUP_{model}$ and from the measured sensor pressure FUP respectively. These calculated gradients are supplied to a gradient difference unit 304 which calculates a difference between these gradients. Furthermore, the comparator unit 300 has an absolute value difference unit 303 which determines the difference between the measured pressure FUP and the calculated model pressure $FUP_{model}$. The gradient difference determined by the gradient difference unit 304 and the absolute value difference determined by the absolute value difference unit 303 are correlated with predetermined value ranges. If it is found that one of the two characteristic quantities or both characteristic quantities are outside the respectively predetermined value ranges, then the comparator unit 300 generates a fault signal which indicates to the control unit 19 that a damage has occurred in the pressure sensor 23 of the pressure accumulator 17. The control unit 19 can thereupon indicate, for example, to the operator of the internal combustion engine that the pressure sensor must be exchanged immediately.

According to the invention, therefore, the functioning capacity or operatability of the pressure sensor 23 can be checked in a simple way, with the aid of a simple model calculation, on the basis of the measurement data already detected as standard in the injection system. There are therefore no additional measurement transducers. Furthermore, the function monitoring system according to the invention can also be adapted in a simple way to the respective circumstances in the internal combustion engine.

Figure 3:
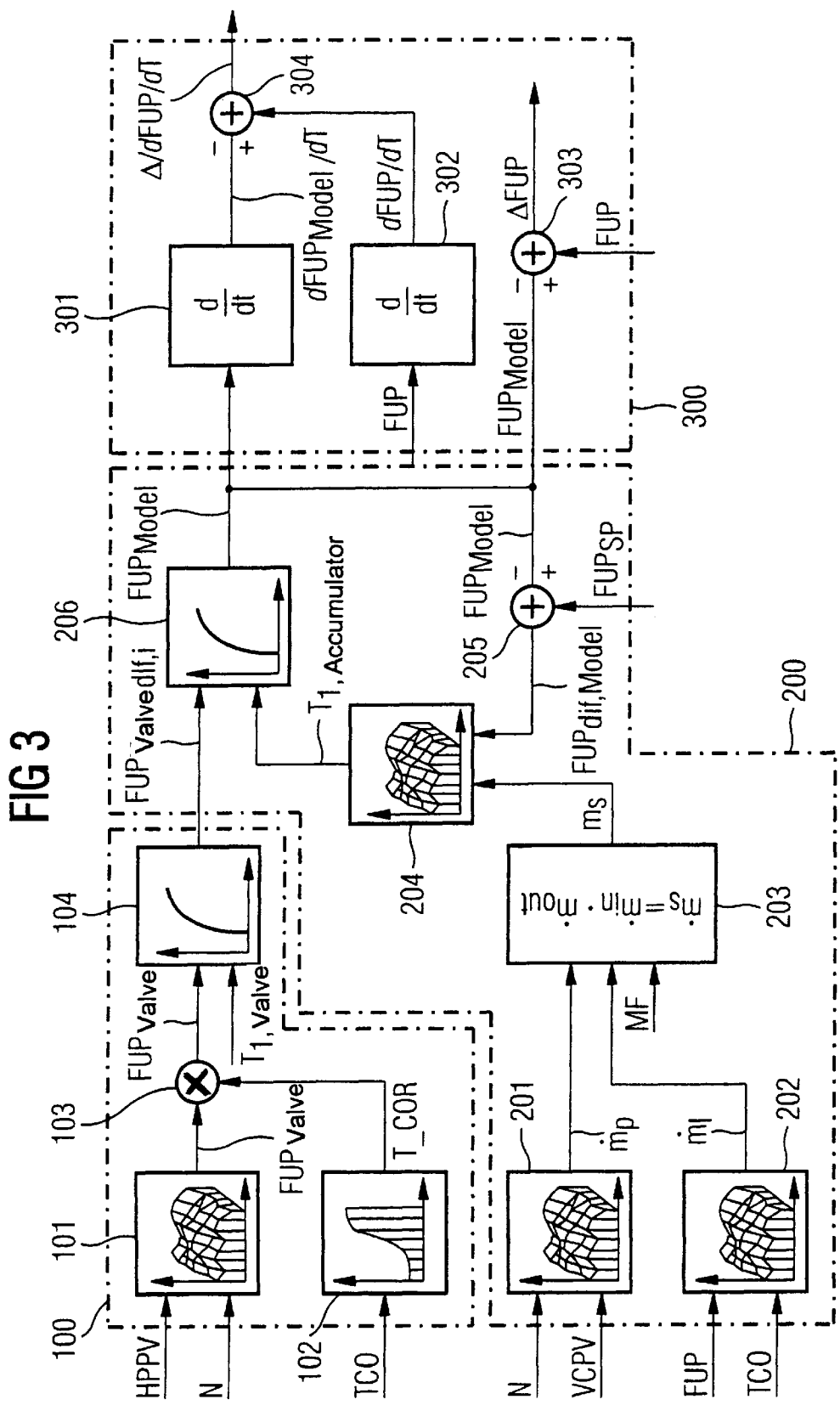
FIG. 3 is a block diagram of an embodiment of the function monitoring system shown in FIG. 2.

FIG. 2 shows the basic configuration of the function monitoring system according to the invention, FIG. 3 shows a possible embodiment of the basic configuration of the function monitoring system according to the invention. Here, a function monitoring is carried out during the pressure build-up phase in the injection system, when the pressure regulating valve 16 is completely closed. The valve mass flow $\dot{m}_v$ can thus be set at zero.

Figure 4:
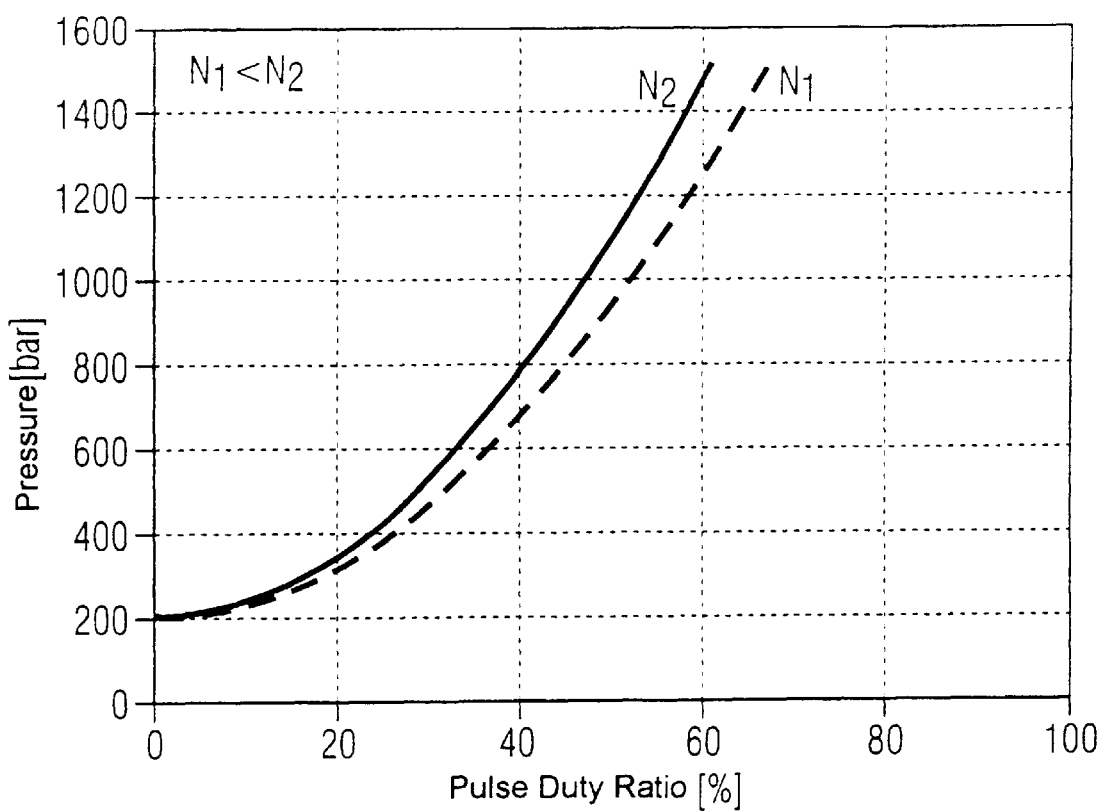
FIG. 4 is a graph of characteristic curves of a pressure regulating valve for different rotational speeds of an internal combustion engine.

According to FIG. 3, the pressure actuator evaluation unit 100 has a holding pressure mapping unit 101, to which the duty ratio HPPV of the activating signal for the pressure regulating valve 16 and the current rotational speed N of the internal combustion engine are applied. From these two values, the holding pressure mapping unit 101 determines the current holding pressure $FUP_{valve}$ of the pressure regulating valve with the aid of a stored characteristic diagram. FIG. 4 shows characteristic curves of the holding pressure of a pressure regulating valve, plotted against a duty ratio of the pulse-width modulated activating signal of the pressure regulating valve, for two different rotational speeds $N_1$ and $N_2$ of the internal combustion engine. These characteristic curves form the basis of the characteristic curve diagram used in the holding pressure mapping unit 101.

Figure 5:
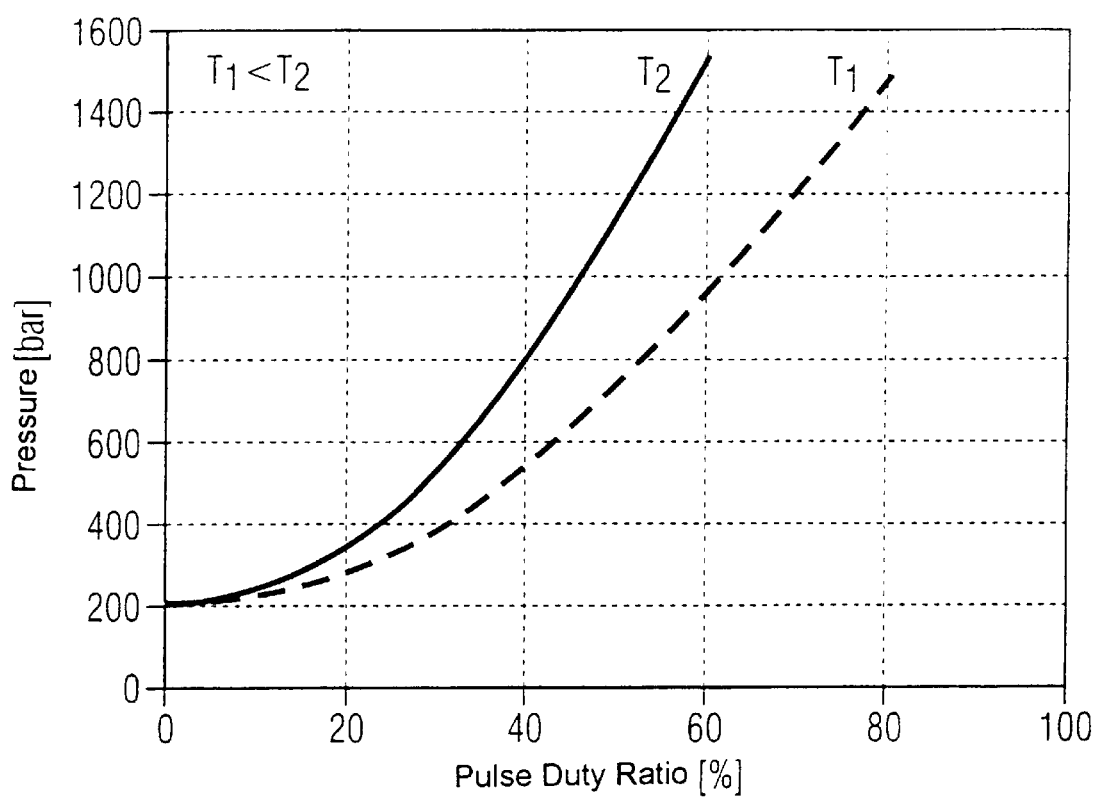
FIG. 5 is a graph of characteristic curves of a pressure regulating valve for different temperatures in an internal combustion engine.

The pressure actuator evaluation unit 100 also has a temperature mapping unit 102, to which the coolant temperature determined in the internal combustion engine is applied. The temperature mapping unit 102 calculates a correction factor T_COR from the coolant temperature through the use of a stored characteristic curve, in order to compensate the temperature response of the pressure regulating valve, such as is shown in FIG. 5 for two different temperatures $T_1$ and $T_2$. A compensating unit 103 multiplies this correction factor T_COR by the holding pressure $FUP_{valve}$ determined by the holding pressure mapping unit 101, in order to determine a temperature-compensated value.

This compensated holding pressure is supplied to a discrete delay element of the first order 104 which modulates the time behavior of the actuator in the pressure regulating valve 16. The calculation instruction for this delay element can be expressed by the following equation:

$$FUP_{valve,dft,i} = \frac{1}{T_{1,valve}/T_a + 1}\left(\frac{T_{1,valve}}{T_a} FUP_{valve,dft,i-1} + FUP_{valve,i}\right) \qquad (8)$$

The time constant $T_{1,valve}$ of the delay element is specific to the pressure regulating valve used and its order of magnitude is 10 ms. The scanning time is determined by the time between two combustion operations in the cylinder of the internal combustion engine and amounts, for example, to 5 ms.

The current delayed valve holding pressure determined by the delay element of the first order 104 of the pressure actuator evaluation unit 100 is supplied to a further delay element of the first order 206 which is contained in the accumulator pressure evaluation unit 200. The calculation instruction of this delay element is described by the following equation (9):

$$FUP_{accumulator,i} =$$
$$\frac{1}{T_{1,accumulator}/T_a + 1}\left(\frac{T_{1,accumulator}}{T_a} FUP_{accumulator,i-1} + FUP_{valve,dft,i}\right)$$

The time constant $T_{1,accumulator}$ is predetermined by the functional units 201 to 205 of the accumulator pressure evaluation unit 200. In this case, the current rotational speed N of the internal combustion engine and the activating signal VCPV of the high-pressure pump 15 or of the suction throttle valve 14 are supplied to the pump feed flow mapping unit 201. From these, the pump feed flow mapping unit 201 calculates the feed mass flow $\dot{m}_p$ of the high-pressure pump 15 with the aid of a stored characteristic curve diagram. At the same time, the leakage mapping unit 202 determines the leakage mass flow $\dot{m}_l$, with the aid of a stored characteristic curve diagram, from the pressure FUP currently prevailing in the pressure accumulator 17 and from the coolant temperature TCO. The feed flow mapping unit 201 and the leakage mapping unit 202 supply the calculated values to a calculation unit 203, to which the value of the current injection quantity MF is simultaneously applied. From these values, the calculation unit 203 calculates the mass balance $\dot{m}_s$ for the pressure build-up operating state, in which the valve mass flow $\dot{m}_v$ can be set at zero. This calculated mass balance $\dot{m}_s$ is correlated, in a characteristic diagram, in a time constant calculation unit 205 with a difference model pressure $FUP_{dif,model}$, which is calculated in the difference unit 205 from the model pressure FUP and a desired pressure $FUP_{SP}$, in order to determine the time constant $T_{1,accumulator}$. This time constant $T_{1,accumulator}$ amounts to about 100 ms in the pressure build-up operating state, but to about 20 ms in the pressure reduction operating state. The characteristic diagram data used in the functional units 101, 102, 201, 202 and 204 may be determined by simulation calculation on the basis of the equations specified above or else may be determined experimentally.

The model pressure $FUP_{model}$ determined by the delay element of the first order 206 is correlated in the comparator unit 300 with the pressure value measured by the pressure sensor 17.

The correlation is done in a manner that is analogous to the exemplary embodiment illustrated in FIG. 2, the determined characteristic quantities, the gradient difference and the absolute value difference, being evaluated in order to diagnose the functioning capacity of the pressure sensor 23.

We claim:

1. A method for monitoring a pressure sensor determining a pressure in a pressure accumulator regulated by a pressure actuator, the method which comprises:

calculating an expected pressure value in a pressure accumulator for a given point in time based on a holding pressure preset at a pressure actuator and based on a detected rate of change in a mass balance of a medium contained in the pressure accumulator;

determining a pressure value in the pressure accumulator with a pressure sensor at the given point in time;

comparing the expected pressure value with the pressure value determined by the pressure sensor for detecting a difference value;

calculating a gradient of the expected pressure value;

calculating a gradient of the pressure value determined by the pressure sensor;

comparing the gradient of the expected pressure value with the gradient of the pressure value determined by the pressure sensor for detecting a gradient difference value; and detecting a malfunction in the pressure sensor if at least one of an absolute value of the difference value exceeds a predetermined difference value and if an absolute value of the gradient difference value exceeds a predetermined gradient difference value.

2. The method according to claim 1, which comprises calculating the holding pressure in the pressure accumulator from a control value of the pressure actuator, delayed by a predetermined time constant, the holding pressure being preset at the pressure actuator for the given point in time.

3. The method according to claim 2, which comprises calculating the holding pressure from the control value in dependence of at least one of a rotational speed of an internal combustion engine and a cooling temperature of the internal combustion engine.

4. The method according to claim 1, which comprises:

calculating the rate of change in the mass balance of the medium contained in the pressure accumulator at the given point in time from an injection mass flow into an internal combustion engine, from a leakage mass flow of injection valves of the internal combustion engine and from a feed mass flow supplied to the pressure accumulator; and monitoring the pressure sensor during a pressure build-up operating state of the internal combustion engine with the pressure actuator closed.

5. In an injection system having a pressure sensor determining a pressure in a pressure accumulator regulated by a pressure actuator, a device for monitoring the pressure sensor, the device comprising:

an accumulator pressure evaluation unit for calculating an expected pressure value in a pressure accumulator for a given point in time based on a holding pressure preset at a pressure actuator and based on a detected rate of change in a mass balance of a medium contained in the pressure accumulator; and a comparator unit connected to said accumulator pressure evaluation unit comparing the expected pressure value calculated for the given point in time with a pressure value determined by a pressure sensor at the given point in time and detecting a malfunction in the pressure sensor if an absolute value of a difference between the expected pressure value and the pressure value determined by the pressure sensor exceeds a predetermined difference value said comparator unit further including a model pressure calculation unit calculating a gradient of the expected pressure value, a sensor pressure calculation unit for calculating a gradient of the pressure value determined by the pressure sensor, and a gradient difference unit connected to said model pressure calculation unit and to said sensor pressure calculation unit for calculating a gradient difference between the calculated gradients and for detecting a malfunction in the pressure sensor if an absolute value of the gradient difference between the calculated gradients exceeds a predetermined gradient difference value.

6. The device according to claim 5, including a pressure actuator evaluation unit connected to said accumulator pressure evaluation unit and having a delay element of the first order for calculating the holding pressure preset at the pressure actuator from a control value of the pressure actuator, delayed by a predetermined time constant.

7. The device according to claim 6, wherein said pressure actuator evaluation unit includes:

a holding pressure mapping unit for calculating the holding pressure preset at the pressure actuator from the control value of the pressure actuator in dependence on a rotational speed of an internal combustion engine; and a temperature mapping unit for determining a correction value of the holding pressure according to a temperature of the internal combustion engine.

8. The device according to claim 5, wherein said accumulator pressure evaluation unit includes a delay element of the first order for calculating the expected pressure value in the pressure accumulator at the given point in time based on the holding pressure preset at the pressure actuator, delayed by a time constant, the time constant being calculated in dependence on the detected rate of change in the mass balance of the medium contained in the pressure accumulator at the given point in time.

* * * * *